(12) United States Patent
Calzaferri et al.

(10) Patent No.: US 8,173,041 B2
(45) Date of Patent: May 8, 2012

(54) METHOD FOR INTERCALATING CHROMOPHORES INTO ZEOLITE-L NANOCHANNELS AND PRODUCTS THEREOF

(75) Inventors: Gion Calzaferri, Bremgarten (CH); Luisa De Cola, Münster (DE); Michael Busby, Münster (DE); Christian Blum, Bad Bentheim (DE); Vinod Subramaniam, Enschede (NL)

(73) Assignees: University of Twente, Enschede (NL); Westfalische Wilhems-Universitat Munster, Munster (DE)

( * ) Notice: Subject to any disclaimer, the term of this patent is extended or adjusted under 35 U.S.C. 154(b) by 520 days.

(21) Appl. No.: 12/361,616

(22) Filed: Jan. 29, 2009

(65) Prior Publication Data
US 2010/0003188 A1 Jan. 7, 2010

(30) Foreign Application Priority Data
Jul. 3, 2008 (GB) .................................. 0812218.6

(51) Int. Cl.
*C09K 11/06* (2006.01)
*H01L 31/00* (2006.01)
(52) U.S. Cl. ............................... 252/301.16; 250/214.1
(58) Field of Classification Search ............. 252/301.16; 250/214.1
See application file for complete search history.

(56) References Cited

U.S. PATENT DOCUMENTS

| | | | |
|---|---|---|---|
| 5,573,585 A | 11/1996 | Lauth et al. | |
| 5,968,242 A | 10/1999 | Hölderich et al. | |
| 6,932,919 B2* | 8/2005 | Alzaferri | 252/301.16 |
| 7,108,802 B2* | 9/2006 | Corma Canos et al. | 252/301.16 |
| 7,372,012 B2* | 5/2008 | Calzaferri | 250/214.1 |
| 7,914,702 B2* | 3/2011 | Calzaferri | 252/301.16 |
| 7,960,124 B2* | 6/2011 | Popovic et al. | 435/7.1 |

FOREIGN PATENT DOCUMENTS
WO  WO 02/36490 A1  5/2002

OTHER PUBLICATIONS

Huanrong Li et al., "Carboxyester functionalised dye-zeolite L host-guest materials", Microporous and Mesoporous Materials 95 (2006) 112-117.
Andre Devaux et al., "Solubilisation of dye-loaded zeolite L nanocrystals", Microporous and Mesoporous Materials 90 (2006) 69-72.
Dominik Bruhwiler et al., Molecular sieves as host materials for supramolecular organization, Microporous and Mesoporous Materials 72 (2004) 1-23.
Sherman D. Cox et al., "Second Harmonic Generation by the Self-Aggregation of Organic Guests in Molecular Sieve Hosts", Chemistry of Materials, 1990, 2, 609-619.

(Continued)

*Primary Examiner* — David M. Brunsman
(74) *Attorney, Agent, or Firm* — Leydig, Voit & Mayer, Ltd.

(57) ABSTRACT

The present invention discloses a method for the intercalation of a chromophore within channels of a zeolite L crystal. The intercalated chromophores exhibit J type aggregation of the chromophores within the channels of the zeolite L crystals. The invention discloses method parameters which lead to the J type aggregation of the chromophores within the channels of the zeolite L crystals. The J type aggregation of the chromophores affords unique florescent properties rendering the intercalated zeolite L crystals as a material for use in novel optoelectronic devices.

9 Claims, 4 Drawing Sheets

OTHER PUBLICATIONS

U. Vietze et al., "Zeolite-Dye Microlasers", Physical Review Letters, Nov. 23, 1998, 81. 4628-4631.

Mikalai M. Yatskou et al., "Electronic Excitation Energy Migration in a Photonic Dye-Zeolite Antenna", Chemphyschem, 2003, 4, 567-587.

Calzaferri, G.; "Zeolite Microcrystals as Hosts for Supramolecular Organization of Dye Molecules"; CHIMIA, vol. 52, No. 10, pp. 525-532 (Oct. 1998).

Ruiz, A.Z. et al.; "Organizing Supramolecular Functional Dye-Zeolite Crystals"; Angewandte Chemie International Edition, vol. 45, No. 32, pp. 5282-5287 (2006).

Calzaferri, G. et al.; "Playing with dye molecules at the inner and outer surface of zeolite L", Solid State Sciences, vol. 2, pp. 421-447 (2000).

Lutkouskaya, K. et al.;"Transfer of Electronic Excitation Energy between Randomly Mixed Dye Molecules in the Channels of Zeolite L", Journal of Physical Chemistry B, vol. 110, No. 11, pp. 5633-5638 (Feb. 2006).

Gfeller, N. et al.: "Fast Energy Migration in Pyronine-Loaded Zeolite L Mircrocrystals", Journal of Physical Chemistry B, vol. 103, No. 8, pp. 1250-1257 (Feb. 1999).

* cited by examiner

METHOD FOR INTERCALATING CHROMOPHORES INTO ZEOLITE-L NANOCHANNELS AND PRODUCTS THEREOF

CROSS RELATION TO OTHER APPLICATIONS

The present application claims priority from UK patent application number 0812218.6 which was filed on 3 Jul. 2008.

FIELD OF INVENTION

The present invention relates to a method for the intercalation of a chromophore into a channel of a zeolite L crystal and products thereof, to manufacture materials with modified spectroscopic characteristics (i.e. emission spectra, life time, and excitation energy transfer). The modified spectroscopic characteristics are due to J-aggregation of the chromophores within the channels of the zeolite L crystal. The manufactured zeolite material can be used for new photonic devices.

BACKGROUND OF INVENTION

Zeolites are alumino-silicate crystalline minerals which have a microporous structure. Zeolites have an "open" structure that can accommodate a wide variety of molecules and zeolites are often referred to as "molecular sieves". The term molecular sieve refers to a particular property of zeolite materials, i.e. their ability to selectively sort molecules based primarily on a size exclusion process. The size exclusion process is due to a highly regular pore structure of molecular dimensions of the zeolite. The maximum size of a molecular or ionic substance that can enter the pores of the zeolite is controlled by the diameters of the channels (or tunnels) within the zeolite. These channels are conventionally defined by the ring size of the aperture, where, for example, the term "8ring" refers to a closed loop that is built from 8 tetrahedrally coordinated silicon (or aluminium) atoms and 8 oxygen atoms. These rings are not always perfectly flat and symmetrical, this is due to a variety of effects, including strain induced by the bonding between units that are needed to produce the overall structure, or coordination of some of the oxygen atoms of the rings to cations within the zeolite structure. Therefore, the pore openings for all channels may not be identical.

Conjugated systems (i.e. a molecular substance of covalently bonded atoms linked to one another by alternate single and double bonds) have unique properties that give rise to strong colours. Many pigments (and dyes) make use of conjugated electron systems, such as beta-carotene's long conjugated hydrocarbon chain resulting in a strong orange colour. When an electron in a conjugated system absorbs a photon of light of a specific wavelength, the electron can be promoted to a higher energy level.

Conjugated systems form the basis of chromophores. Chromophores are light-absorbing parts of a molecule which can cause the molecular substance to be coloured. Such chromophores are often present in various organic compounds and sometimes present in polymers, which are coloured or glow in the dark. They are usually caused by conjugated ring systems with bonds such as $C=O$ and $N=N$ in addition to conjugated $C-C$ bonds.

Solid state molecular packing of organic conjugated systems is one of the factors which determine their electronic and optical properties and therefore their potential use in electronic and optoelectronic devices. The solid state molecular packing of anisotropic molecular systems may lead to J-aggregation of the conjugated organic molecules.

A spectroscopic advantage of J-aggregation is the substantial line narrowing of absorption and emission spectra which is paralleled by a red-shift of absorption with respect to the corresponding molecular electronic transition. The former spectroscopic effect is related to the exciton band narrowing due to coherent coupling of molecular electronic wave functions. The latter spectroscopic effect arises from the head-to-tail coupling of the molecular transition dipole moments. The exciton band narrowing is more pronounced as the exciton is delocalised over an increasing number of molecules. The exciton delocalisation is determined by the competition between intermolecular transfer interactions and static disorder imposed by the molecular environment.

Therefore to form J-aggregates in the solid state, the molecular packing and the solid state molecular ordering of the conjugated systems needs to be specifically tailored and controlled.

The organisation of organic conjugated molecular systems into nano and sub-nanoscale scaffold structures is an appealing methodology towards the formation of tailoring such highly specific structured conjugated molecular systems.

Zeolites exhibit internal channels on the nano and sub-nanometre scale, furthermore zeolites posses a defined crystalline structure and a morphology which can be tuned between the micro and the nano scale. Zeolites have applications in a number of industrial applications such as photonics and optoelectronics, these include, but are not limited to; nonlinear optics (Cox, S D et al., Chem. Mater. 1990, 2, 609), micro-lasers (Vietze U et al, M. Phys. Rev. Lett., 1998, 81.4628), light harvesting, electroluminescent devices and charge separation.

However, fundamental problems exist as to how molecules diffuse and intercalate into the channels of zeolites, how the intercalated molecules are organised within the zeolite channels and as a consequence of their organisation, how they react within the zeolite channels and interact with each other inside these scaffold channels.

A zeolite L crystal possesses a crystalline structure and sub-nanometre one-dimensional channels making the zeolite L crystal an appealing host for the organisation of conjugated molecules (such as fluorescent dyes) by the intercalation of the conjugated molecules in the channels of the zeolite L crystal. The channels of the zeolite L crystal have an entrance diameter of 7.1 Å(Angstroms, 0.1 nm, $10^{-1}$ m), a maximum cage diameter of 12.6 Å and a single unit cell length of 7.5 Å. Furthermore the zeolite L crystal comprise a parallel channels which are separated by a distance of 18.4 Å.

Based on the one-dimensionality of the channels of the zeolite L crystal, space restrictions are more prevalent in the zeolite L crystal than in the other zeolite structures, such as zeolite X or zeolite Y. This makes the zeolite L crystal more attractive as a scaffold for packing the conjugated molecule to achieve J aggregation of the conjugated molecules.

Pyronine intercalated, and oxonine intercalated with zeolite L crystal systems (FIG. 1b and 1c) are ideal for fundamental studies of unidirectional energy transfer, and such systems are known in the art, as well as applications in highly fluorescent self assembling micro objects.

It is accepted that such intercalated chromophore molecules are individually aligned at defined angles and may not slide, or stack on top of each other, thus preventing excimer formation and J-aggregate formation. Smaller, neutral molecules that may stack on top of each other have been shown to possess excimer transitions.

Interestingly, the "end to end" alignment of conjugated chromophore molecules like pyronine and oxonine can be envisaged to result in J-aggregate type coupling. The specific teachings to achieve this phenomenon are so far unreported.

Observing and understanding such excitonic J-aggregate type coupling in one dimensional channel systems is therefore of considerable scientific and industrial interest.

Lifetime studies on pyronine intercalated zeolite L crystal have shown loading dependent multi-exponential decays indicating that the molecules of the pyronine intercalated zeolite L crystal may interact with each other or the environment. Experimental evidence is still, however, confined to bulk samples. To date, few pioneering examples of spatially resolved analysis of single microcrystals at the diffraction limit exist, but the full potential has not been reached.

U.S. Pat. No. 5,968,242 is assigned to Ciba Speciality Chemicals Corporation, New York, USA. The Ciba patent discloses a molecular sieve, which contains in all, or only in some of its cavities colourant molecules as well as a modifier which is covalently bound to said molecular sieve and which reduces its pore diameter. The patent further discloses a process for the preparation of the molecular sieve as well as the use of the molecular sieve as a pigment for colouring high molecular weight organic materials, preferably biopolymers and plastic materials, glasses, ceramic products for formulations of decorative cosmetics for the preparation of paint systems, preferably automotive lacquers, printing inks, dispersion paints and colour filters as well as materials comprising the novel molecular sieve.

U.S. Pat. No. 5,573,585 is assigned to Wolfgang Hoelderich of Germany. The Wolfgang patent discloses crystalline molecular sieves useful as a colourant which contain one or more chromophores of the class of mono- or -polyazo dyes that are devoid of acidic groups.

International patent application publication number WO 02/36940 is assigned to the University of Bern, Switzerland. The University of Bern publication discloses a dye loaded zeolite material comprising: a) at least one zeolite crystal having straight through uniform channels each having a channel axis parallel to, and a channel width transverse to, a c-axis of crystal unit cells; b) closure molecules having an elongated shape and consisting of a head moiety and a tail moiety, the tail moiety having a longitudinal extension of more than a dimension of the crystal unit cells along the c-axis and the head moiety having a lateral extension that is larger than said channel width and will prevent said head moiety from penetrating into a channel; c) a channel being terminated, in generally plug-like manner, at least at one end thereof located at a surface of the zeolite crystal by a closure molecule hose tail moiety penetrates into said channel and whose head moiety substantially occludes said channel end while projecting over said surface; and d) an essentially linear arrangement of luminescent dye molecules enclosed within a terminated channel adjacent to at least one closure molecule and exhibiting properties related to supramolecular organisation.

A paper by Calzaferri et al. in the Journal Microporous and Mesoporous Materials, Volume 95 (2006), pages 112-117, is titled "Carboxyester functionalised dye-zeolite L host-guest materials". The publication discloses a method for the selective modification of zeolite L channel ends with carboxyl terminated groups. The success of the method is tested by vibrational spectroscopy, optical microscopy and energy transfer experiments after binding strongly luminescent dyes to the carboxyl groups. The method was carried out on 5000 nm and 30 nm sized zeolite L crystals.

A further paper by Calzaferri et al. in the Journal Microporous and Mesoporous Materials, Volume 90 (2006), pages 69-72, is titled "Solubilisation of dye-loaded zeolite L nanocrystals". The publication discloses a method for the solubilisation of zeolite L nanocrystals in different solvents by grafting alkoxysilane derivatives with a hydrophobic part to the zeolite nanocrystal, which leads to a transparent suspension in non-polar solvents, while modification with a positively charged complex leads to solubilisation in water.

A further paper by Calzaferri et al. in the Journal Microporous and Mesoporous Materials, Volume 72 2004, pages 1-23, is titled "Molecular sieves as host guest materials for supramolecular organisation". The publication discloses the use of zeolites and mespoporous silicas as host materials for the supramolecular organisation of organic dye molecules.

With the aim of developing a device system that exploits intermolecular excitonic interactions in one dimensional geometries, the present invention discloses the use of advanced single crystal fluorescence lifetime and spectrally resolved confocal microscopic methods to manufacture and investigate examples of J-aggregate coupling between chromophores (florescent dye molecules) in the sub nano-metre, one-dimensional nano-channels of zeolite L crystals.

Pyronine, DXP, PDI and oxonine intercalated with zeolite L have been used for the study of the unidirectional energy transfer as well as applications in highly fluorescent self assembling micro objects.

A prior art document CHEMPHYSCHEM 2003, Volume 4, pages 567-587, and describes electronic exitation energy migration in a photonic dye-zeolite, where Forster-type materials have been observed. Electronic excitation energy migration in a photonic host-guest material has been investigated by time resolved experiments and by Monte Carlo calculations. The host consists of a linear channel system (zeolite L crystal). The linear channels are filled with energy transporting dyes (donors) in their middle section and by one or several monolayers of a strongly luminescent trapping dye (acceptors) at each end of the linear channels. Excitation energy is transported among the donors in a series of steps until it reaches an acceptor at one of the channel ends, or it is somehow trapped on its way, or escapes by spontaneous emission. The organisation of chromophores in the linear channels is reported by Monte Carlo simulation and reports time resolved on a variety of pyronine-zeolite L crystal, oxonine-zeolite L crystal, and oxinine, pyronine-zeolite L crystal materials. In the oxinine, pyronine-zeolite L crystal material, the pyronine acts as a donor and the oxinine as an acceptor. The CHEMPHYSCHEM 2003, 4, 567-587 document discloses that the luminescent decay of the crystals containing one kind of dye is a single exponential decay for moderate loading of the chromophore when measured under oxygen free conditions. However bi-exponential decay otherwise. The excitation energy is transported along the channels by a Forster type mechanism, where the excitation energy is emitted as a red luminescence.

The present invention describes the preparation of materials of one dimensional excitonic character of tuneable coherence length on the range of 30 nm to 10000 nm or 20 chromophores up to 70000 chromophores where J-aggregation is observed.

The coherence length is very important as it determines the range over which excitation can be transported without negligible loss of excitions.

In the prior art it is generally very difficult to control coherence length due to defects—and it is generally more difficult to have the coherence length in one dimension.

Arrays with very little distortions and defects can be made inside the one dimensional channels of the zeolites because the entropy that leads to the defects can be overcome by the enthalpy due to the size restrictions.

Length of the lifetime studies on the pyronine intercalated zeolite L crystal show loading dependent multi-exponential decays.

With the ultimate aims of developing a device system that exploits intermolecular excitonic interactions in one dimensional geometries, the present invention discloses the use of advanced single crystal fluorescence lifetime and spectrally resolved confocal microscopy methods to present a novel example of J-aggregate coupling between chromophore molecules in the sub nano-metre, one dimensional nano-channels of the zeolite L crystals.

SUMMARY OF INVENTION

The present invention discloses a method for the manufacture of a zeolite L crystal, which comprises intercalated chromophores within a plurality of channels of the zeolite L crystal and wherein the chromophores exhibit J-aggregation within the plurality of channels of the zeolite L crystal.

The chromophores pyronine, DXP and DPI have been intercalated in the zeolite L crystals at different loading grades from 0.6% up to 20%. While changing the loading grade the emissions spectra and the lifetime of the intercalated chromophores are altered. Higher loadings of 20% result in a chromophore gradient along the channel axis and the presence of an additional red shifted spectroscopic transition with shorter lifetimes. The new bands are assigned to an inline arrangement of the chromophore molecules undergoing a J-aggregate type coupling. Material of one dimensional excitonic character of tuneable length in the range of 30 nm up to 10000 nm (20 chromophores up to 7000 chromophore) can be prepared and used for new photonic devices and smart pigments.

DETAILED DESCRIPTION

Figure 1:
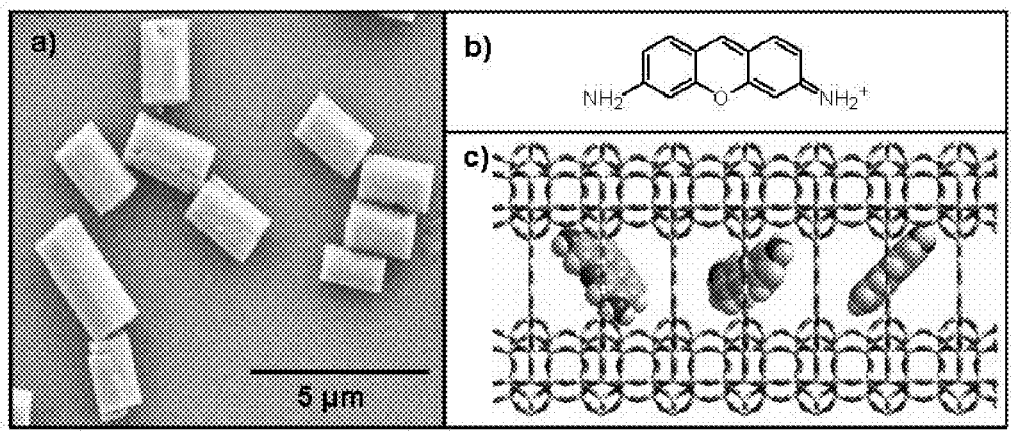
FIG. 1 shows a) SEM image of the 3 µm zeolite samples and b) Structure of the cationic pyronine (Py) molecule.
Figure 2:
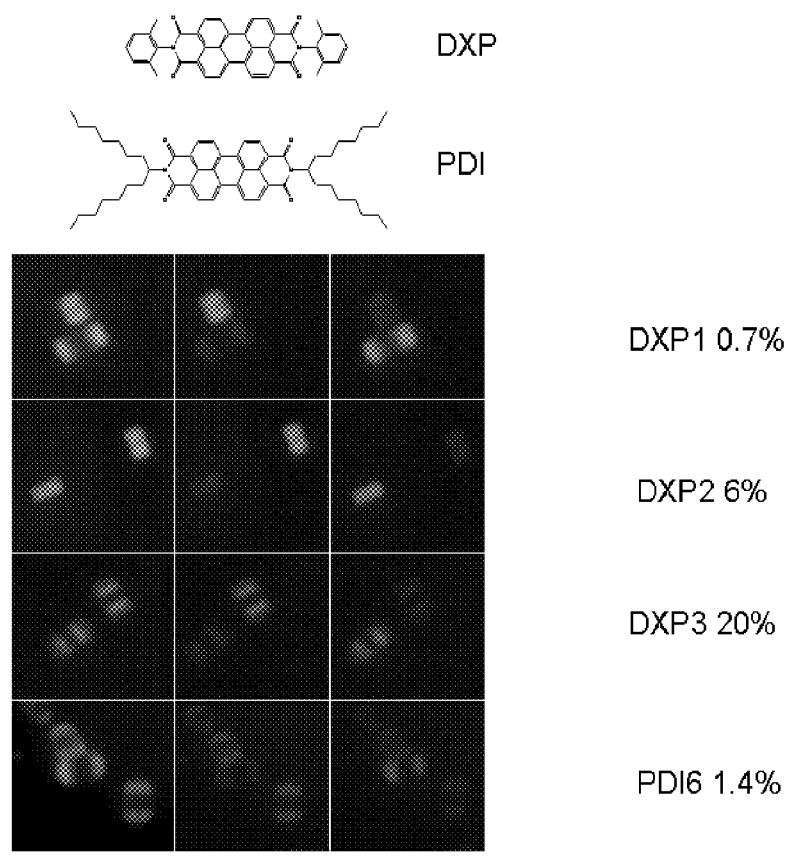
FIG. 2 shows J-aggregate interactions of DXP and PDI in zeolite L crystals at different loadings.
Figure 3:
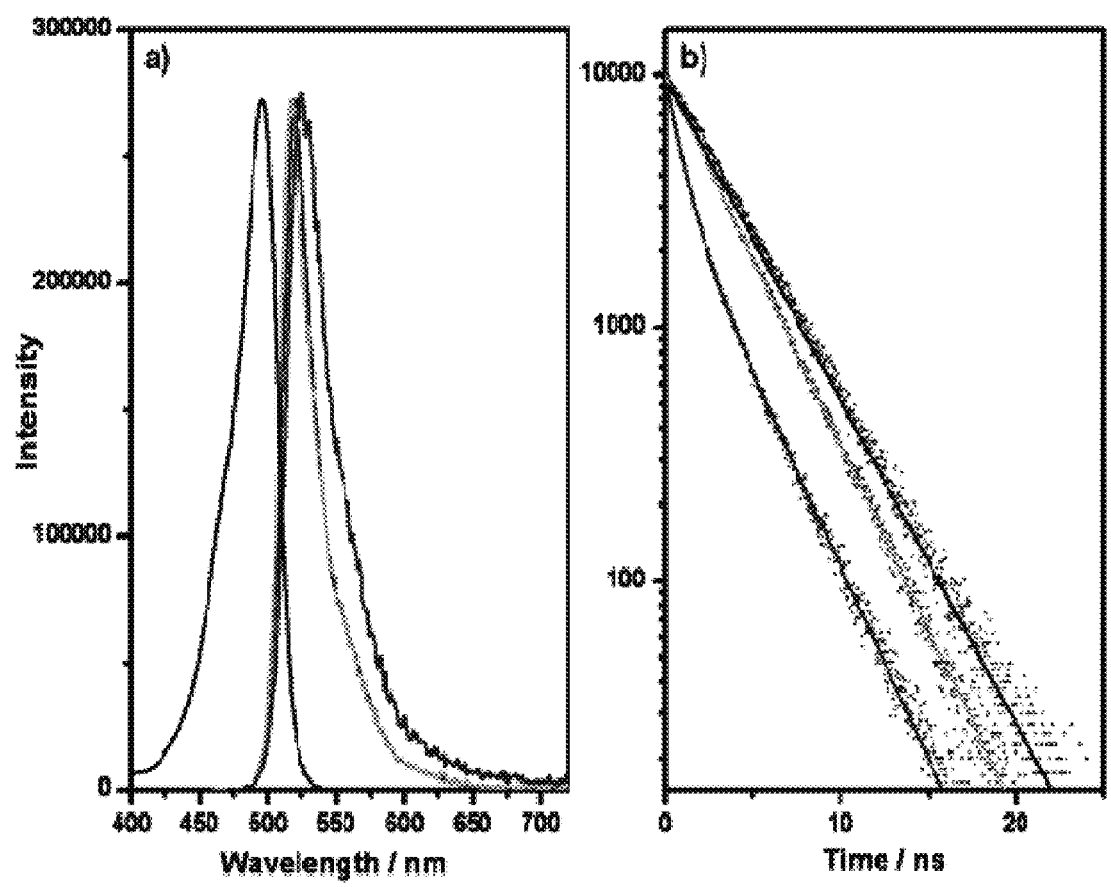
FIG. 3 shows a) Absorption of Py in MeOH, emission spectra ($?_{ex}$=470 nm) of Py in MeOH (black), 0.6% Py-zeolite L, (green) and 20% Py-zeolite L, (red) suspended in MeOH. b) Lifetime decay traces and fits for Py in MeOH τ?=3.6 ns (black), 0.6% Py-zeolite L, τ=2.9 ns (green) and 20% Py-zeolite L τ?$_1$=2.4 ns (61%) and τ$_2$=0.7 ns (39%) (red) suspended in MeOH. $?_{ex}$=431 nm, ??$_{em}$=550 nm, excitation pulse FWHM<200 ps.

For a complete understanding of the present invention and the advantages thereof, reference is made to the following detailed description taken in conjunction with the accompanying Figures.

It should be appreciated that the various aspects of the invention discussed herein are merely illustrative of the specific ways to make and use the invention and do not therefore limit the scope of invention when taken into consideration with the claims and the following detailed description and the accompanying Figures. It will be noted that features from one aspect of the invention can be combined with features from other aspects of the invention.

The teachings of the cited documents should be incorporated by reference into the description.

Three different loadings of the chromophore DXP (N,N'-Bis(2,6-dimethylphenyl)perylene-3,4,9,10-tetracarboxylic diimide) were intercalated with the zeolite L crystal and were obtained at loadings of 0.7%, 6% and 20%.

The chromophore PDI (perylene-3,4:9,10-bis(dicarboximide)) was also intercalated into the zeolite L crystal and a maximum loading of 1.2% was achieved.

The chromophore pyronine was also intercalated with the zeolite L crystal with loadings of 0.6% and 20%.

The loading of the chromophores into the zeolite L crystal channels can be expressed as a number of chromophores per zeolite L crystal channel. Thus if a length (1) of the zeolite L crystal channel is 1-crystal and a length of the chromophore is 1-chromophore. Then the number of chromophores per zeolite L crystal channel can be calculated. For example if the length of the zeolite L crystal channel (1-crystal) is 1000 nm and the length of the chromophore (1-chromophore for example pyronine) is 1.5 nm. Then the maximum loading of the chromophores into the zeolite L crystal channels can be calculated by (1-crystal)/(1-chromophore). Therefore the maximum loading of the chromophores into the zeolite L crystal channels would be approximately 6700 chromophores per channel.

In a further example if the length of the zeolite L crystal channel (1-crystal) is 30 nm and the length of the chromophore (1-chromophore for example pyronine) is 1.5 nm. Then the maximum loading of the chromophores into the zeolite L crystal channels can be calculated by (1-crystal)/(1-chromophore). Therefore the maximum loading of the chromophores into the zeolite L crystal channels would be approximately 25 chromophores per channel.

It is known that the ratio of void volume of a zeolite crystal and its total volume is about 0.26. Therefore a maximum volume that can be occupied by the chromophore is in the order of 20%.

The amount of the chromophore present in the zeolite L crystal channel can be measured by following a number of known procedures. A well known procedure is to dissolve a weighed amount of the intercalated chromophore zeolite L material (in diluted hydrofluoric acid) and then to measure the absorption spectrum of the resultant solution. The chromophore is not affected by this procedure. A further procedure for determining the amount of the chromophore present in the zeolite L crystal channel is to measure the absorption spectrum of a known amount of the intercalated chromophore zeolite L material which is immersed in a refractive index matching matrix. A further method for determining the amount of the chromophore present in the zeolite L crystal channel can be achieved by using quantitative Raman or FT-IR spectroscopy.

In the case of the pyronine intercalated zeolite L crystal, the absorption spectra of the intercalated molecules dissolved and extracted from the zeolite L crystal showed identical spectra to that of a free molecule. Both bulk and single crystal experiments proved that 0.6% pyronine intercalated zeolites behave as the free molecule in solution, with similar emission spectral shapes and energies, though slightly reduced lifetimes.

The presence of intercalated chromophores that exhibit J type aggregation of the chromophores within the channels of the zeolite L crystals is observed in the electronic absorption spectrum and in the luminescence spectrum (possibly time resolved) of either a bulk sample or of single crystals in an optical microscope of the zeolite L crystals intercalated with chromophores within the channels of the zeolite L crystal (see for example; Time, Space and Spectrally Resolved Studies on J-Aggregate Interactions in Zeolite-L Nanochannels, Michael Busby, Christian Blum, Marc Tibben, Sandra Fibikar, Gion Calzaferri, Vinod Subramaniam and Luisa De Cola, J. Amer. Chem. Soc. 130, 2008, 10970-10976).

For the DXP-intercalated zeolite L crystals, a distinct loading dependant emission was observed. A loading of DXP of 0.7% was seen to have a green emission in the middle of the crystal and yellow on the ends. A loading of DXP of 6% was green/yellow in the middle and orange on the ends. A loading of DXP of 20% was yellow in the middle and intensely red on the ends.

The PDI-intercalated zeolite L crystal sample at 1.2% loading showed a green emission localized on the ends of the crystals. The crystal middle regions were devoid of emission. The emission of the all DXP-intercalated zeolite L crystal and PDI-intercalated zeolite L crystals were polarized along the axis of the crystals, indicating that the molecules were intercalated in the channel systems of the crystals, and not merely absorbed on the external surface of the zeolite L crystal.

Emission spectra were performed upon excitation into the main absorption band at 500 nm. A DXP loading of 0.7% and 6% and a PDI loading of 1.2% showed similar spectra. The emission spectra showed maxima at 555 nm, with a second, less intense vibronic band at 598 nm. The DXP loading of 20% has the first band maxima at blue shifted to 547 nm and is of equal intensity to the second band at 590 nm. A third intense very broad band in seen at 650 nm, which spans to the limit of the detector around 800 nm.

Finally excitation spectra were measured, upon monitoring the emission at 650 nm. In all cases the excitation spectra resembled the absorption. The DXP loading of 0.7% and 6% and the PDI loading of 1.6% showed maxima at 535 nm, whereas the DXP loading of 20% again showed the maximum at 525 nm and the red shifted shoulder between 550 and 615 nm.

The loading grade of pyronine has a significant impact of the fluorescent lifetime. Free pyronine molecule in methanol possesses a life time of 3.6 ns. The 0.6% loading of pyronine shows a mono exponential decay; thereby the excited state is reduced in lifetime by 0.7 ns to 2.9 ns. The 20% loading of pyronine samples show bi-exponential kinetics of $\tau_1=2.4$ ns and $\tau_2=0.7$ (39%) ns.

The above observed characteristics are explained by J-aggregate coupling, as absorption and emission band at lower energy than the monomer and decay occurs with a reduced lifetime.

Time-space and spectrally resolved data prove that the preparation of material of one dimensional excitonic character of tuneable coherence length in the range of 30 nm (20 chromophores) up to 10000 nm (7000 chromophores) is possible. This material can be used for the development of photonic devices which can be used for (organic) LEDS, solar cells, sensors, and others. The photonic devices might be based on the following configuration: A zeolite L crystal with a diameter of 600 nm that consists of roughly 100000 strictly parallel channels at 1.84 nm distance. Each of these channels is plugged with a stopcock that can be excited in the blue range (electrically or optically). A performed excitation will be radiation less transferred to the one dimensional excitonic wire inside the crystal thereby transported to the other side of the zeolite crystal at high speed and then re-transferred (again radiation less) to an acceptor at slightly lower energy. The excited acceptor later on can fulfil many specific tasks.

Both bulk and single zeolite L crystal experiments show the 0.6% loaded pyronine zeolite L crystals to behave as the free molecule in solution, with similar emission spectral shapes and energies, though slightly reduced lifetimes. The single crystal experiments confirm that there are no local variations in spectra or lifetime. Single exponential kinetics are fitted in all cases, indicating that there are no vast variations in the local environments around the emissive molecules and the zeolite L crystal structure.

A more complex picture is presented in the pyronine intercalated zeolite L crystals at a loading of 20%, which displayed variations in emission intensity, corresponding to variations in dye loading, and an inverse relation with the fluorescence lifetime. Interestingly, regions of highest loading gave rise to a second, red-shifted spectroscopic transition at 630 nm, which possessed a lifetime of 1.1 ns. This fast decay corresponds to the 0.7 ns decay component seen in the multi-exponential bulk lifetime measurements. Similarly the region of lowest loading had a population maximum at 1.6 ns, again consistent with the longer component at 2.4 ns. Such behaviour is dramatically different from the sample with low loading and indicates that the intercalated molecules are experiencing differing environments. The possibilities will now be discussed it more detail.

Re-absorption or radiative energy transfer processes cannot be ruled out and are thought to result in the shift in absorption maxima between the band maxima of the 0.6% and 20% loaded samples, from 518 to 525 nm. Importantly, the blue part of the emission spectrum, close to the absorption overlap is thought to be solely affected. Studies of pyronine at low and high concentrations in solution also confirm the expected increase in decay lifetime that result from high concentrations. Although the reabsorption processes are present, the trend towards shorter lifetime in regions of higher concentration are in contrast to the expected increase in lifetime, thus ruling the reabsorption process out as a cause of the novel band at 630 nm and shorter lifetimes. Homo FRET or energy migration between pyronine molecules is also not thought to have a significant effect, as no changes in lifetime are expected from this process. Similarly, photonic processes such as the influence of lifetime induced by the dielectric of the medium can be excluded due to index matching immersion oil which was used to cover the zeolite L crystals.

Excimers and H-aggregates in the super cages of the zeolite X crystal and the Y crystal have been observed for neutral and cationic molecules such as pyrene, perylene, aranthacene and thionine at low concentrations. The interaction involves the face to face stacking of the molecules in close proximity, an arrangement accommodated for by the 3 dimensional super cages. Excimers have been observed for aranthacene in the zeolite L crystal, based on a linear arrangement of the chromophore molecules. In contrast, no evidence for excimers or H-aggregates exists for pyronine molecules, either in solution or in the zeolite L crystal. A direct proof of this has been performed by comparing the intercalation of a similar xanthene dye, thionine into the zeolite L crystal and Y crystal. H-aggregates were present only in the zeolite Y crystal, which result in a quenched emission. Furthermore, theoretical geometrical constraints, indeed exclude the possibility of face to face stacked molecules in a single unit cell. Interestingly, studies on the intercalation of pyronine into the zeolite L crystal at a loading of 0.6% have shown that the molecules align themselves at an angle of 72° between two unit cells, though studies could not be performed at higher concentrations.

Based on the geometrical impossibility of excimers and H-aggregates being formed, J-aggregate coupling is observed. The J-type aggregates result from an inline arrangement of the conjugate molecules transition dipoles that undergo an exciton coupling.

Equation 1 describes the change in excited state energy in wavenumbers $\beta_c$. Important parameters are the oscillator strength f, (0.60 for pyronine), from which the electronic transition dipole moment $\mu_{AA}*$ can be calculated, the distance between the two molecules $R_{DA}$, their relative orientation towards each other described as $\kappa_{A*A}$ and the refractive index of the medium n (a range between 1-1.49 has been taken as the extremes for the zeolite L crystal).

$$\beta_c = \frac{1}{4\pi\varepsilon_0 n^2} \frac{|\mu_{AA*}|^2}{R_{DA}^3} \kappa_{A*A}$$

Equation 1

The typically J-aggregate coupling results in absorption bands and emission bands at lower energy than the monomer and decay with a faster lifetime, characteristics that are indeed present in the measurements of the present invention.

Figure 4:
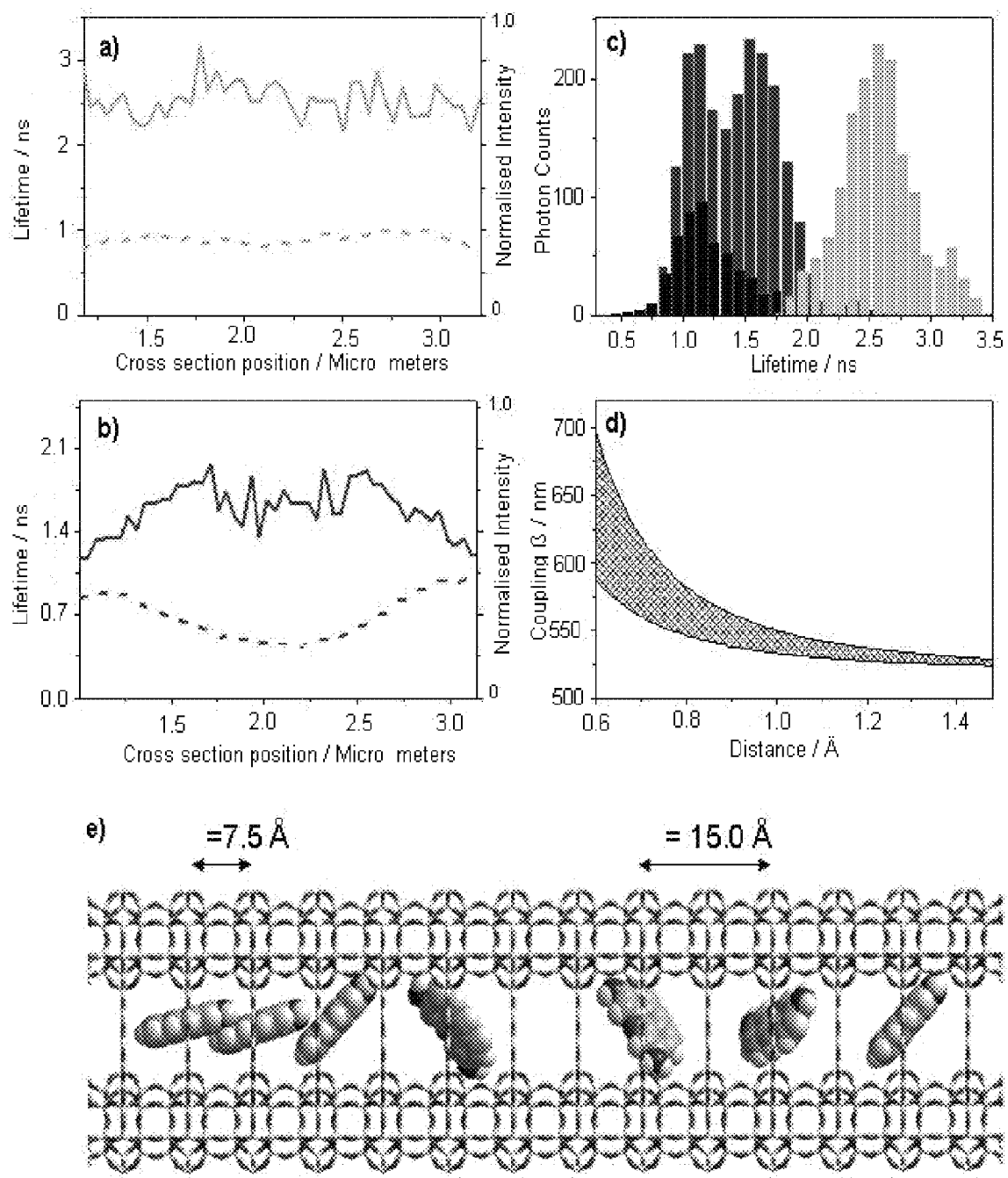
FIG. 4 shows a) Variations in lifetime and normalised intensity along a cross-section of the single 0.6% zeolite L crystal, and b) 20% Zeolite L a) Monoexponential lifetime distribution histogram of the single zeolite L crystal, shown in FIG. 4 at 0.6% loading (green), 20% loading (red) and 20% loading+640-700 band pass filter (Black). d) The calculated spectral shift in nm between two pyronine molecules undergoing excitonic coupling, as a function of their centre to centre distance, zeolite refractive indexes of 1 and 1.49 are represented by the top and bottom curves, respectively. e) Molecular models of two different packing densities of Pyronine in Zeolite L channels.

Furthermore, the new luminescence band is seen in regions of highest loading, where the probability of achieving a dense packing is highest. The new red shifted aggregates may also act as an energy acceptor from the isolated pyronine molecules. Such a process may contribute to an additional energy transfer pathway that generally reduced lifetimes seen throughout the 20% loaded zeolite L crystals. The packing of pyronine in the zeolite L channels can be visualized in FIG. 4e. The pyronine molecule on the left of FIG. 4, each occupy one unit cell. Here the centre-to-centre distance between adjacent ones of the pyronine molecules is approximately 7.5 Å. Calculations predict shifts up to approximately 600 nm depending on the chosen refractive index of the medium. These calculated value fits well to the spectral data and provide a theoretical argument of the existence of the J-aggregate coupling in the zeolite-L crystal channels, a phenomenon so far not reported. The pyronine molecules on the right of FIG. 4e span two unit cells each, with the pyronine molecules having a cone angle of 72°. Here, the centre-to-centre distance between the two pyronine molecules is about 15 Å. Interaction energy is low in this instance, and any corresponding band splitting is expected to be very small. This is the arrangement based on low loadings of the zeolite L crystals and has been confirmed by detailed polarisation studies.

The lack of aggregates is seen in the mono-exponential decay kinetics and spectra that correspond to the free molecule. The low absolute concentration of the aggregates explains it's near invisibility in the bulk spectra, where it is masked by the monomer emission.

EXAMPLES

All spectroscopic measurements were carried out in solutions or suspensions of spectroscopic grade methanol solutions in 10 mm quartz cuvettes at low concentrations (less than 1 mg for 2 ml or <0.5 mg/ml). The steady-state emission spectra were recorded in RA mode on a HORIBA Jobin-Yvon IBH FL-322 Fluorolog 3 spectrometer equipped with a 450 W xenon arc lamp, double grating excitation and emission monochromators (2.1 nm/mm dispersion; 1200 grooves/mm) and a TBX-4-X single-photon-counting detector. Emission spectra were corrected for source intensity (lamp and grating) and emission spectral response (detector and grating) by standard correction curves. Time-resolved measurements were performed using the time-correlated single-photon counting (TCSPC) option on the Fluorolog 3. NanoLEDs (431 nm; FWHM<750 ps) with a repetition rate of 1 MHz was used to excite the sample. The excitation sources were mounted directly on the sample chamber at 90° to a double grating emission monochromator (2.1 nm/mm dispersion; 1200 grooves/mm) and collected by a TBX-4-X single-photon-counting detector. Signals were collected using an IBH DataStation Hub photon counting module and data analysis was performed using the commercially available DAS6 software (HORIBA Jobin Yvon IBH)

Microscopy

The emission from individual pyronine loaded zeolite L crystals was characterised using a custom-built setup capable of wide field fluorescence imaging as well as scanning stage confocal microscopy for fluorescence lifetime and spectral imaging. Light sources used were a mercury lamp for wide field fluorescence imaging and a pulsed laser diode emitting at 469 nm (BDL475, Becker & Hickl, Germany) for local excitation when recording lifetimes and emission spectra. The sample was illuminated using a 100× objective (100×, 1.4 NA oil, UPlanSapo, Olympus), and the emission from the sample was collected by the same objective. Wide field images were recorded with a colour camera (AxioCam HRc, Zeiss). For the emission images a standard blue filter cube (U-MWB2, Olympus) was used. White balance was optimized for a halogen light temperature of 3200 K in accordance to the manufacturer's recommendation for fluorescence imaging. Verification of the consistency between the colour camera image and the colouring visible via the eyepiece of the microscope was undertaken. Contrast, brightness and gamma were globally optimized for the entire images, and no digital colour changing filters were applied. To highlight colour variations barely visible in the true colour images, false colour images were calculated by separating the RGB values from the image files and division of the red channel by the green channel after applying a threshold to account for noise and background signal. When laser for confocal imaging was used, the filtercube was replaced by a glass plate as beam-splitter and a long-pass filter (RazorEdge 473.0 nm, Semrock, USA) to block reflected and scattered excitation light.

For fluorescence lifetime imaging a time correlated single photon counting (TCSPC) module (SPC-830, Becker & Hickl, Germany) attached to a single photon avalanche diode detector (PDM Series, MPD, Italy) was used. The lifetime data was analysed using the Becker & Hickl SPCImage software package. To record local emission spectra emitted light was imaged via a prism spectrometer onto a cooled CCD camera (Newton EMCCD DU970N-BV, Andor). Wavelength calibration was achieved using a calibrated light source (Cal-2000 Mercury Argon Calibration source, Ocean Optics, USA).

Example 1

Zeolite L Crystal Synthesis

The zeolite L crystals were synthesised by known methods. Potassium hydroxide (Fluka, pellets≧86%), sodium hydroxide (Merck, pellets≧99%) and aluminum hydroxide (Riedel-de Haën, powder purum) were diluted in bi-distilled deionised water. To this solution a silica suspension (Evonik AeroDisp W 1226) was added with vigorous stirring in order to obtain a white gel with the following composition $3Na_2O:9.6SiO_2:1Al_2O_3:158.6H_2O$. The white gel was transferred into a Teflon vessel that was sealed and put into an oven for 144 hours at 160° C. The obtained white solid was washed several times with bi-distilled deionised water and dried. The zeolite L crystal was characterized with XRD, SEM and EDX.

Example 2

Zeolite L Crystal Intercalation with Pyronine Chromophore

The zeolites L crystals were heated to 80° C. in the presence of an aqueous solution of pyronine for a period of 12 hours. Pyronine chromophore has been chosen due to its high absorption cross-section and emission quantum yield. Samples were dispersed and centrifuged repeatedly from methanol, in order to remove free dye absorbed on the zeolite L crystal surface. In the case of the sample corresponding to 20% loading, a second identical intercalation was performed. Loading assays were performed by dissolving a known mass of crystals in Hydrofluoric acid (HF) and measuring the absorption spectrum of the free chromophore, thus calculating its concentration, % loading=no. molecules/no. sites, where no. sites=no. unit cells×2.

Example 3

Zeolite L Crystal Intercalation with DXP Chromophore, Zeolite L Crystal Intercalation with PDI Chromophore The 3 μm zeolite L crystals and the calculated amount of acetone chromophore solution were mixed in a glass ampoule and dried on a lab pump with the use of a heat gun. The ampoules were then sealed at a pressure of $10^{-5}$ mbar. Ampoules were placed in a rotating oven for 48 hours at 300° C. for DXP and 180° C. for PDI, temperatures were determined by the melting points of the chromophore molecules.

Higher or lower temperatures would either result in chromophore decomposition or a lack of filling the channels of the zeolite L crystals.

The intercalated zeolite L crystals were sonicated in and centrifuged from acetone several times until the supernatant was clear. Samples were also inspected under the microscope to ensure no free chromophore molecule were present.

Loading assays were performed by dissolving the DXP and PDI intercalated zeolite L crystals in 2 drops of 1% HF solution for 40 min. The dye molecules phase was extracted with 2 ml of DCM (dichloromethane) and the aqueous phase was neutralized with $NaCO_3$. Absorption spectra of the DCM phase was used to calculate the concentration of the chromophore molecules in solution, and hence the loading in the zeolite L crystal in percentage of filled sites (1 site=2 uc).

The absorption spectrum was also used to confirm the chemical stability of the chromophores after high temperature intercalation.

Spectroscopic measurements were carried out in Quartz cuvettes, using a methanol suspension of the zeolites L crystals for emission and excitation spectra and toluene for absorption spectra. Emission and excitation spectra were measured with a slit width of 1 nm. Samples of clean crystals were dry cast on a microscope slide and inspected under either a 100× magnification air objective.

Example 4

Loading

Three different loadings of intercalated DXP chromophore with the zeolite L crystals were obtained at 0.7%, 6% and 20%. The chromophore PDI was intercalated into zeolite L crystal, with a loading of 1.2%.

The absorption spectra of the intercalated molecules dissolved and extracted from the zeolite L crystal display an identical spectra to that the free molecule. This confirms the lack of chemical change of the chromophore that occurs during the insertion.

Example 5

Microscopy and Polarisation

Samples were inspected under an eppiflorescent microscope, using 450-480 excitation filter and a 515 long pass emission filter. Representative crystals can be seen in FIG. 1. For the most part, crystals are seen to be fluorescent. Shorter intercalated crystals have a more homogeneous loading gradient where as larger crystals present a loading gradient between the ends and the middle.

For the DXP intercalated zeolite L crystals, a distinct loading dependant emission was observed. The DXP loading of 0.7%, was seen to have a green emission in the middle of the crystal and yellow on the ends. The DXP loading of 6% was green/yellow in the middle and orange on the ends. The DXP loading of 20% was yellow in the middle and intensely red on the ends.

The PDI chromophore intercalated zeolite L crystal with 1.2% loading showed a green emission localised on the ends of the crystals. The crystal middle regions were devoid of emission.

The emission of all of the DXP and PDI intercalated zeolite L crystals were polarised along the axis of the crystals, indicating that the molecules were intercalated in the channel systems of the zeolite L crystals, and not merely absorbed on the external surface of the crystals.

Example 6

Absorption Spectra

In order to further understand the nature of the loading dependant emission colours, spectroscopic method were employed. The absorption spectrum of DXP and PDI were measured in dichloromethane (DCM). A vibronic progression is seen to grow towards the red with bands at 458 nm, 488 nm and a maximum absorption at 525 nm, typical of the perylene diimide core. The zeolite L crystals were dispersed in a refractive index matching solvent toluene, and absorption spectra were recorded. All samples including the empty zeolite L crystals showed a strong background, which could be attributed to Raleigh scattering. The scattering background could be subtracted by means of a polynomial function.

Absorption bands of the DXP intercalated zeolite L crystals with 0.7% and 6% loading and the PDI intercalated zeolite L crystals with 1.2% loading, showed absorption patterns similar to that of the free molecules, with maxima at 535 nm for the DXP and 525 nm for PDI. The DXP intercalated zeolite L crystal with 20% loading also resembled the vibronic progression of the free molecules, although the maxima was seen at 530 nm, and a shoulder was clearly visible between 550 and 615 nm, a feature not present in the lower loaded samples.

Example 7

Emission and Excitation Spectra

Emission spectra were performed upon excitation into the main absorption band at 500 nm. Both the free DXP molecules and PD1 molecules in DCM gave similar emission spectra which resembled the mirror image of the absorption spectra. The vibronic maxima are seen to decrease in intensity from 535 nm to 575 nm and 625 nm. Interestingly, both samples of the free DXP molecules and PD1 molecules in DCM show a concentration dependence of emission, which results in a significant reduction in intensity and red shift of the 535 nm band to 544 nm. This phenomenon has been reported previously for perylene and is due to reabsorption.

The emission spectra of the zeolite L crystals were subsequently measured again upon 500 nm excitation. The DXP intercalated zeolite L crystals with 0.7% and 6% loading and the PDI intercalated zeolite L crystals with 1.2% loading showed similar spectra. The emission spectra showed maxima at 555 nm, with a second, less intense vibronic band at 598 nm. The difference in intensities for the DXP loading of 6% was less, again the result of reabsorption. A shoulder was seen between 630 nm to 750 nm, which may correspond to the third vibronic band. This shoulder was seen to be more intense in the DXP loading of 6%. The DXP loading of 20%, on the other hand, has the first band maxima at blue shifted to 547 nm and is of equal intensity to the second band at 590 nm. A third intense very broad band in seen at 650 nm, which spans to the limit of the detector around 800 nm.

The emission was then re-measured, exciting into the shoulder seen in the absorption spectra at 550 nm. The DXP intercalated zeolite L crystals with 0.7% and 6% loading and the PDI intercalated zeolite L crystals with 1.2% loading showed the second and third vibronic bands, at similar ratios and positions to that seen at 500 nm excitation. The DXP intercalated zeolite L crystal with 20% loading consisted almost entirely of the broad band seen at 650 nm, and did not resemble the spectral at lower loadings.

Finally excitation spectra were measured, upon monitoring the emission at 650 nm. In all cases the excitation spectra resembled the absorption. The DXP intercalated zeolite L crystals with 0.7% and 6% loading and the PDI intercalated zeolite L crystals with 1.2% loading showed maxima at 535 nm, whereas the DXP intercalated zeolite L crystal with 20% loading again showed the maximum at 525 nm and the red shifted shoulder between 550 and 615 nm.

Example 8

Excitation and Luminescence Spectra of PC21$^+$-Zeolite L

Figure 5:
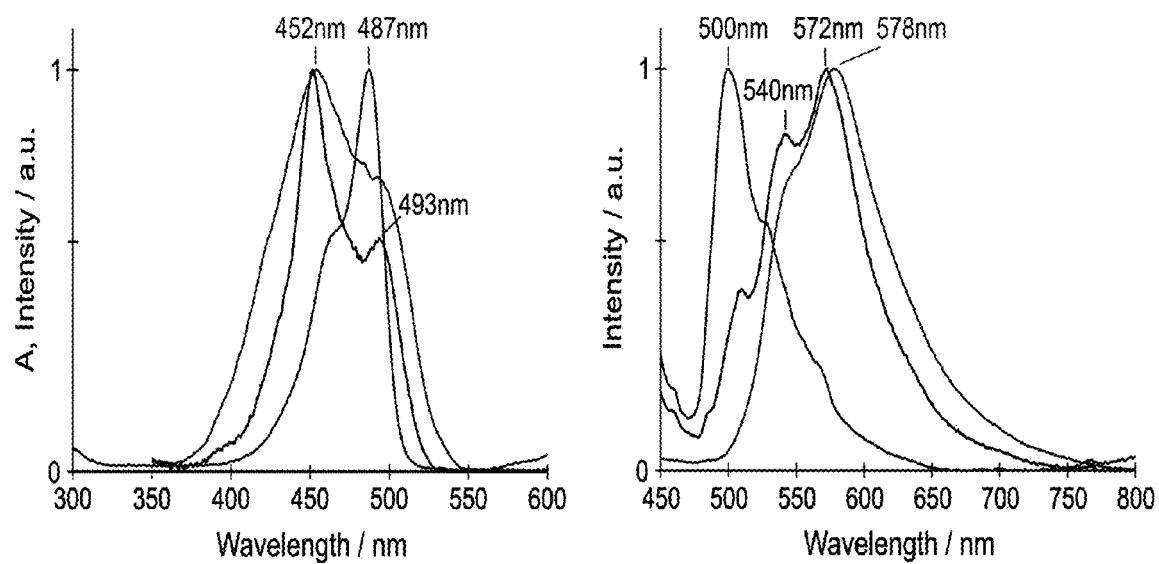
FIG. 5 shows Absorption, excitation and emission spectra of PC21$^+$ scaled to 1 at the peak maxima. Left: Absorption spectrum of PC21$^+$ in 10$^{-6}$ M solution (green line), excitation spectra of PC21$^+$-zeolite L at p=0.068 (deep red line, emission observed at 540 nm) and p=0.18 (orange line, emission observed at 640 nm). Right: Emission spectra of PC21$^+$-zeolite L at p=0.045 (green line), at p=0.068 (deep red line) and p=0.18 (orange line).

FIG. 5 shows excitation and luminescence spectra of the chromophore PC21$^+$-zeolite L crystals of different loadings and compare them with the absorption spectrum of a 10$^{-6}$ M solution and the luminescence spectrum of a PC21$^+$-zeolite L sample with 0.045% loading (green lines). With increasing loading the excitation band, FIG. 5 (left), splits into a shorter and a longer wavelength components, at 452 nm and 493 nm, respectively. Two additional bands appear in the emission spectrum, one at 540 nm and a second at 572 nm, FIG. 5 (right). At high loading the additional band at 572 nm becomes the most prominent one and shifts slightly to the red, from 572 to 578 nm.

PC21$^+$ has a very high extinction coefficient of 165,900 M$^{-1}$ cm$^{-1}$, and its oscillator strength is equal to 1.4, therefore, the J-aggregate coupling can be considerable.

Figure 6:
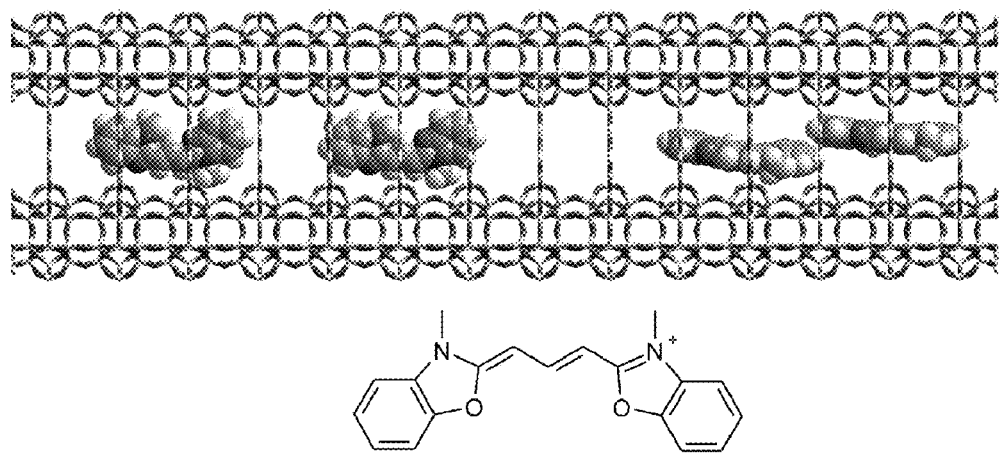
FIG. 6 upper shows an illustration of the cyanine chromophore PC1$^+$ (below) molecules in a channel of zeolite L. Left: non-interacting molecules. Right: stacking occurring at higher loading.

The PC21$^+$ chromophore enters the channels reluctantly. The actual procedure to intercalate the chromophore is to reflux an n-octane suspension containing zeolite L crystals and an excess of the chromophore at 110° C. for 18 hours. Based on this, on the spectroscopic observations in FIG. 5, and on the observation in a fluorescence microscope that the emission of the PC21$^+$-zeolite L crystals is polarized parallel to the c-axis, we can deduce the situation depicted in FIG. 6, where we show on the upper left the non interaction situation and on the upper right the stacking of the chromophore molecules which occurs at higher packing.

Having thus described the present invention in detail, it is to be understood that the foregoing detailed description of the invention is not intended to limit the scope of the invention thereof. The person skilled in the art will recognise that the invention can be practiced with modification within the scope of the attached claims. At least, it should be noted that the invention is not limited to the detailed description of the invention and/or of the examples of the invention. What is desired to be protected by letters patent is set forth in the following claims.

The invention claimed is:

1. A method for the manufacture of a zeolite L crystal comprising:
   preparing a mixture of N,N'-Bis(2,6-dimethylphenyl) perylene-3,4,9,10-tetracarboxylic diimide (DXP) or perylene-3,4:9,10-bis(dicarboximide) (PDI) with the zeolite L crystal, wherein the zeolite L crystal has a plurality of channels with a channel length of between 30 to 10000 nm,
   heating the mixture at a pressure of 10$^{-5}$ mbar to a temperature of 300° C. for DXP and 180° C. for PDI; and
   removing the non-intercalated chromophore from the manufactured product, wherein the zeolite L crystal has J aggregate chromophores intercalated within the plurality of channels of the zeolite L crystal.

2. The method according to claim 1, wherein the chromophore is intercalated in a quantity in the range from 20 chromophores to 7000 chromophores per channel of the zeolite L crystal, depending on the length of the zeolite L crystal and the size of the chromophore.

3. The method according to claim 1, wherein the chromophore comprises a perylene dye.

4. A zeolite L crystal, interlaced with the chromophore N,N'-Bis(2,6-dimethylphenyl)perylene-3,4,9,10-tetracarboxylic diimide (DXP) or perylene-3,4:9,10-bis(dicarboximide) (PDI), wherein the zeolite L crystal has a channel length of between 30 to 10000 nm and the chromophores are intercalated as J aggregates within the channels of the zeolite L crystal.

5. The zeolite L crystal according to claim 4, wherein the chromophore is intercalated in a quantity in the range from 20 chromophores to 7000 chromophores per channel or up to 20% per channel of the zeolite L crystal.

6. The zeolite L crystal according to claim 4, wherein the chromophore comprises a perylene dye.

7. An optoelectronic device comprising a zeolite L crystal, interlaced with the chromophore N,N'-Bis(2,6-dimethylphenyl)perylene-3,4,9,10-tetracarboxylic diimide (DXP) or perylene-3,4:9,10-bis(dicarboximide) (PDI), wherein the zeolite L crystal has a channel length of between 30 to 10000 nm and the chromophores are intercalated as J aggregates within the channels of the zeolite L crystal.

8. The optoelectronic device according to claim 7, wherein the chromophore is intercalated in a quantity in the range of 20 chromophores to 7000 chromophores per channel or up to 20% per channel of the zeolite L crystal.

9. The optoelectronic device according to claim 7, wherein the chromophore comprises a perylene dye.

* * * * *